United States Patent [19]
Kellner et al.

[11] Patent Number: 5,615,474
[45] Date of Patent: Apr. 1, 1997

[54] AUTOMATIC FASTENING MACHINE WITH STATISTICAL PROCESS CONTROL

[75] Inventors: Robert J. Kellner; Mark F. Cassidy, Jr., both of Orchard Park, N.Y.

[73] Assignee: Gemcor Engineering Corp., Buffalo, N.Y.

[21] Appl. No.: 303,535

[22] Filed: Sep. 9, 1994

[51] Int. Cl.$^6$ .............. B23Q 15/007; B23Q 15/22; B23P 21/00
[52] U.S. Cl. .............. 29/703; 29/243.53; 29/715
[58] Field of Search .............. 29/34 B, 243.53, 29/243.54, 524.1, 525.2, 701, 703, 715; 72/22, 25–27; 227/3, 4

[56] References Cited

U.S. PATENT DOCUMENTS

| | | | |
|---|---|---|---|
| 4,694,984 | 9/1987 | Altwicker | 29/243.53 X |
| 4,762,261 | 8/1988 | Hawly et al. | 29/525.2 X |
| 5,060,362 | 10/1991 | Birke et al. | 29/34 B X |
| 5,210,935 | 5/1993 | Givler | 29/771 X |

FOREIGN PATENT DOCUMENTS

| | | | |
|---|---|---|---|
| 1657269 | 6/1991 | U.S.S.R. | 29/243.53 |
| 1397543 | 6/1975 | United Kingdom | 29/243.53 |

*Primary Examiner*—Peter Vo
*Attorney, Agent, or Firm*—Hodgson, Russ, Andrews, Woods & Goodyear LLP

[57] ABSTRACT

The present invention relates to a system control for directing and monitoring the operation of an automatic fastening machine, such as automatic drilling and riveting machine, by gathering, recording, and processing relevant data from each drilling and riveting cycle. The cycle data then becomes part of a master record that is useful for logging maintenance schedules, for establishing real-time cycle trends and for historical purposes. Real-time cycle trends are particularly beneficial to effect corrections in subsequent cycles.

5 Claims, 16 Drawing Sheets

HOLE PROBE TEST

| PROBE TYPE | * | | GRIP LENGTH | ****** |

ERROR CODE | 0 |

| MINIMUM SEGMENT VALUE | AVERAGE SEGMENT VALUE | MAXIMUM SEGMENT VALUE |
|---|---|---|
| 7.4726 MM | 7.4752 MM | 7.4803 MM |

ALL SEGMENT VALUES

| | | | | | |
|---|---|---|---|---|---|
| 7.4803 | 7.4752 | 7.4777 | 7.4803 | 7.4777 | 7.4777 |
| 7.4777 | 7.4777 | 7.4777 | 7.4777 | 7.4752 | 7.4777 |
| 7.4777 | 7.4777 | 7.4777 | 7.4777 | 7.4777 | 7.4777 |
| 7.4752 | 7.4752 | 7.4752 | 7.4752 | 7.4752 | 7.4752 |
| 7.4752 | 7.4726 | 7.4726 | 7.4752 | 7.4777 | 7.4777 |
| 7.4777 | 7.4777 | 7.4777 | 7.4777 | 7.4752 | 7.4777 |
| 0.0000 | 0.0000 | 0.0000 | 0.0000 | 0.0000 | 0.0000 |

LEVEL AVERAGE

| |
|---|
| 7.4777 |
| 7.4777 |
| 7.4777 |
| 7.4752 |
| 7.4777 |
| 0.0000 |

FIG. 10

| MACHINE FAULT HISTORY |||||
| --- | --- | --- | --- | --- |
| FAULT NAME | LAST | TOTAL | FAULT NAME    LAST | TOTAL |
| X SERV O.T. | | 0 | LOW COLLAR | 0 |
| Y SERV O.T. | | 0 | | |
| Z SERV O.T. | | 0 | A BRAKE SENSOR | 0 |
| A SERV O.T. | | 0 | B BRAKE SENSOR | 0 |
| B SERV O.T. | | 0 | Z BRAKE SENSOR | 0 |
| X AXIS O.L. | | 0 | WAR BRK SEN | 0 |
| Y AXIS O.L. | | 0 | | |
| Z AXIS O.L. | | 0 | DRILL BREAK | 0 |
| A AXIS O.L. | | 0 | | |
| B AXIS O.L. | | 0 | | |
| CIRC. BK. #2 | | 0 | | |
| CIRC. BK. #3 | | 0 | COL DET #1 | 0 |
| CIRC. BK. #4 | | 0 | COL DET #2 | 0 |
| CIRC. BK. #6 | | 0 | COL DET #3 | 0 |
| CIRC. BK. #12 | | 0 | COL DET #4 | 0 |
| CIRC. BK. #13 | | 0 | | |
| | | | | |
| SERVO 1PWS | | 0 | | |
| SERVO 2PWS | | 0 | | |
| | | | | |
| OIL LOW TEMP | | 0 | | |
| OIL OVERHEAT | | 140 | | |
| LOW OIL | | 0 | | |
| SEALANT LOW | | 0 | | |

FIG. 15

AUTOMATIC FASTENING MACHINE WITH STATISTICAL PROCESS CONTROL

BACKGROUND OF THE INVENTION

This invention relates to the art of automatic fastening machines. More particularly, the present invention relates to a system control for directing and monitoring the operation of an automatic fastening machine, such as automatic drilling and riveting machine, by gathering, recording, and processing relevant data from each drilling and riveting cycle. The cycle data then becomes part of a master record that is useful for logging maintenance schedules, for establishing real-time cycle trends and for historical purposes. Real-time cycle trends are particularly beneficial to effect corrections in subsequent cycles.

Many of the processes used for fabricating and assembly of aircraft structures have become automated. This is the case with the installation of fasteners in aircraft assemblies such as wing panels and fuselage sections wherein an automatic drilling and riveting machine accomplishes the task of drilling holes and installing fasteners for the purpose of joining a plurality of workpieces, such as joining a wing panel to a support stringer. In that respect, a typical automatic drilling and riveting machine comprises a multi-position transfer means in the form of a transfer plate assembly having an encoder and a precision guide to obtain a high degree of positioning accuracy for selectively positioning a plurality of special purpose tools mounted thereon over the aircraft assembly to accomplish the sequence of steps required to install each fastener. The plurality of special purpose tools typically include a drill tool assembly having an encoded drill positioning function with system feedback and drill thrust sensing capability; a straight down vision resynchronization camera that periodically realigns the drill positioning system; a linear encoded fastener insertion and upset tool assembly that provides for fastener insertion and upset; a hole inspection tool assembly with collision detector to measure the drilled hole profile and hole location; and a combination ream/shave tool assembly having encoded positioning system feedback and thrust sensing capability.

SUMMARY OF THE INVENTION in accordance with the present invention, the various tool measurements and data gathering functions performed by the various tool assemblies are fed to a machine controller which, in conjunction with a numerical controller, provides programmed control of the automatic drilling and riveting machine. The machine controller is operatively associated with a monitoring and data recording system including a Statistical Process Control (SPC) which serves to monitor and analyze both real-time and historical data related to the automatic drilling and riveting machine operation. This is accomplished by downloading automatic fastening machine functions to the machine controller and the statistical process control. In real-time, the use of SPC is effective in preventing a bad iteration of a process by recognizing a trend and issuing a warning before an unacceptable action takes place. With historical data, the parameters related to a completed process can be analyzed to better configure those parameters to a future process and to track the causes of any past failures.

In the typical fastener installation operation, the transfer means first positions the motorized drill tool assembly over the aircraft assembly such as a wing panel and a hole is drilled through the wing skin and through a support stringer to which the wing panel is to be fastened. Before commencement of the drilling operation, in accordance with the present invention, drill speed, feed rate and approach point settings are programmed into the numerical controller for use by the machine controller to accurately and repetitively position the drill tool aligned along a work centerline corresponding to the precise position of the intended hole. A thrust sensor mounted on the drill tool provides the SPC of the present invention via downloading through the machine controller with thrust signal information related to the thrust force exerted on the drill tool. The thrust force information is then used to detect tool wear, change of workpiece material, or change of drill feed rate.

Upon completion of the hole drilling operation, the transfer means removes the motorized drill tool assembly and, by means of a linear encoder, positions the inspection tool assembly above and aligned along the work centerline through the drilled hole. The hole inspection tool assembly comprises a hole probe that is moved along the centerline and introduced into the hole. Capacitive plates mounted around the periphery of the hole probe provide the SPC of the present invention via downloading through the machine controller with capacitive signal information related to the hole profile including its size and degree of roundness. Measurements can be made of selected depths in the hole, and variable stack thicknesses of a plurality of workpieces can be measured.

After the hole shape is determined to be within an acceptable range of parameters and the hole location has been confirmed, the transfer means removes the hole inspection tool assembly from the work centerline and engages a fastener insertion and upset tool assembly comprising a rivet tool having a large hydraulic operated bucking ram cylinder mounted on the transfer means. In operation, the rivet tool first picks up a rivet and the bucking ram then causes the rivet tool to move along the work centerline to insert the rivet into the hole. An upset cylinder is positioned in centerline alignment with the bucking ram as a back-up on the reverse side of the airplane wing. The bucking ram and upset cylinder co-operate to exert an upset force to thereby form heads on opposite ends of the rivet in a known manner. A linear encoder verifies centerline position of the bucking ram cylinder. The bucking ram can be provided with a vibrating tool that enables the ram to install interference fit fasteners when needed. Measurements provided by sensors on the fastener insertion and upset tool assembly are downloaded through the machine controller to the SPC of the present invention and include rivet upset force and pressure, fastener diameter and length, minimum and maximum workpiece stack thickness, and torque and angle data for two piece-type fasteners using a nut-runner tool in lieu of the rivet tool, all of these functions being well known to those skilled in the art.

After rivet upset, the transfer means disengages the rivet tool from the hydraulic cylinder and positions a motorized ream shave tool assembly aligned along the work centerline and over the rivet. In the shave mode, this tool serves to trim the rivet head on the top side of the wing flush with the wing surface. In accordance with the present invention, shave tool speed, feed rate, and approach point settings are programmed to the numerical controller before the start of the shaving operation for use by the machine controller to accurately and repetitively position the shave tool for operation on the upset fastener. A thrust sensor mounted on the ream/shave tool provides the SPC of the present invention, via downloading through the machine controller, with feedback measurements similar to those recorded during the drilling operation including a thrust signal related to the thrust force extended on the ream/shave tool during the shaving operation. This thrust force measurement then enables an operator to detect ream/shave tool wear, change of fastener material, or change of ream/shave tool feed rate.

In those cases where the metal around the hole is needed to be pre-stressed prior to fastener insertion, the transfer means positions a coldworking tool assembly aligned along the work centerline to introduce a collapsible mandrel, also known as a split mandrel, in a collapsed mode into and through the hole. The mandrel is then expanded and pulled back through the hole to coldwork the adjacent metal by plastically deforming the metal around the hole at a temperature below its annealing point. This increases the metal hardness and tensile strength. The force required to pull the mandrel through the hole is measured by a sensor on the coldworking tool and monitored and recorded by downloading through the machine controller to the SPC of the present invention.

A straight down vision resynchronization camera system, preferably mounted on the transfer means positioned between the drill tool assembly and the fastener insertion and upset tool assembly, serves to fine tune the position of the automatic drilling and riveting machine. The camera relays pictures to the machine controller of reference kado dots or tack rivets inserted into the workpiece at periodic intervals along the intended travel path of the movement of the riveting machine along the aircraft wing. The machine controller then makes appropriate positional corrections for the riveting machine to ensure that the work centerline is maintained aligned along the intended travel path.

OBJECTS

It is therefore an object of the present invention to provide a Statistical Process Control to monitor and analyze both real-time and historical data in an automatic fastening machine.

It is a further object of the present invention to provide downloading of various automatic fastening functions to a Statistical Process Control for such monitoring and analysis of data.

It is a more particular object of the present invention to provide for monitoring and recording operation measurements from a drilling tool assembly in an automatic fastening machine to develop statistical trends that are useful for triggering a warning that the drilling operation may be heading to an upper or lower control limit.

It is a further object of the present invention to provide for monitoring and recording hole profile measurements of a hole drilled by an automatic fastening machine to determine the size and degree of roundness for the hole and whether the hole is positioned at a desired location in the workpiece.

Still further, it is an object of the present invention to provide for monitoring and recording measurements related to the pull force required to move an expanded mandrel back through a drilled hole during coldworking the metal around the hole periphery prior to fastener insertion by an automatic fastening machine.

It is a further object of the present invention to provide for monitoring and recording force measurements by an automatic fastening machine required to upset an inserted rivet-type fastener to determine if the rivet head forming process is stable.

It is a further object of the present invention to provide for monitoring and recording torque and tightening angle measurements from a nut-runner tool of an automatic fastening machine used with two-piece fasteners to determine if a nut has been stripped or not tightened at all.

Still further it is an object of the present invention to provide for monitoring and recording operation measurements from a ream/shave tool assembly of an automatic fastening machine to develop statistical trends that are useful for triggering a warning that the ream/shave operation may be heading to an upper or lower control limit.

It is a further object of the present invention to provide a record such as in the form of a database of fastener installation parameters for each fastener installed in a particular workpiece by an automatic fastening machine.

Finally, it is an object of the present invention to provide a maintenance log for an automatic fastening machine.

These and other objects will become readily apparent to those skilled in the art by reference to the following detailed description and to the drawings in which like reference numerals represent the same or similar parts throughout the views.

IN THE DRAWINGS

FIGS. 10–15 are graphs illustrating operation of the system of FIG. 9.

DETAILED DESCRIPTION

Figure 1:
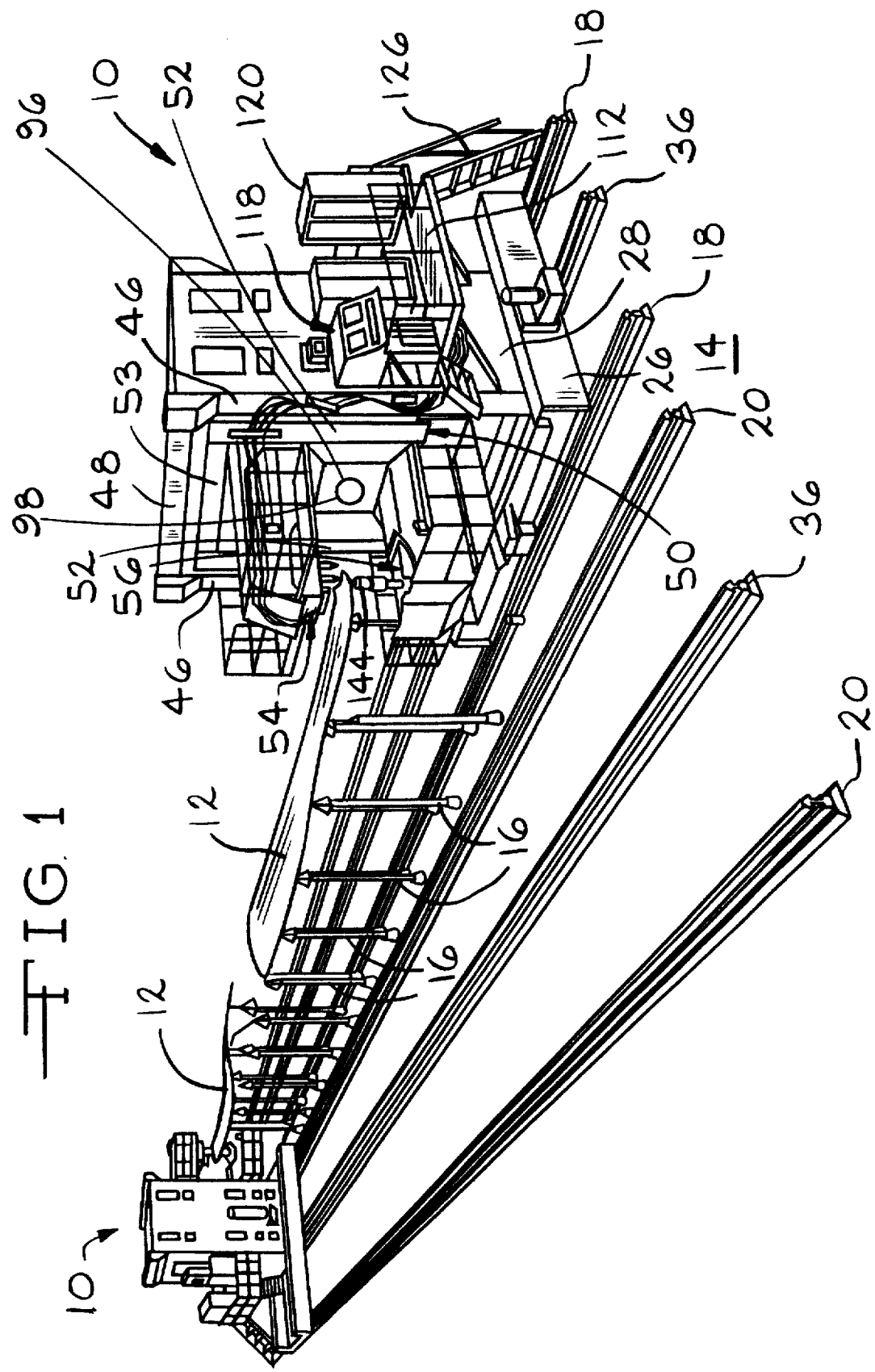
FIG. 1 is a perspective view of an arrangement of a pair of automatic fastening machines each provided with the statistical process control according to the present invention and for operation on a single workpiece.

Referring now to the drawings, FIGS. 1 to 8 show one form of an illustrative automatic fastening machine in the form of a drilling and riveting machine to which the Statistical Process Control (SPC) of the present invention is applicable which riveting machine is generally designated 10. The following detailed description of riveting machine 10 is believed to be helpful in facilitating an understanding of the system control according to the present invention for directing and monitoring the operation of an automatic drilling and riveting machine 10 by gathering, recording and processing relevant data from each drilling and riveting cycle.

FIG. 1 shows an illustrative arrangement wherein two riveting machines 10 are positioned for simultaneous operation on a workpiece, generally designated 12. Each riveting machine 10 is supported on a surface serving as a foundation and generally designated 14 with the workpiece 12 disposed substantially parallel to the support foundation 14. Typically, foundation 14 is the floor of a building such as a factory. In the present illustration, workpiece 12 comprises a contoured airplane wing panel rigidly supported horizontally on formers (not shown) which are calibrated to conform to the contour of the underside of the wing panel workpiece 12, as is well known to those skilled in the art. The formers are held in position by retractable supports 16 provided in a central location with respect to four sets of rails, comprising spaced apart and parallel sets of X-axis rails or tracks 18 and 20. The wing panel shown in FIG. 1 is merely illustrative of various forms of workpiece to which the present invention is applicable.

As shown in FIG. 1, X-axis tracks 18 and 20 and retractable supports 16 are arranged to allow the two riveting machines 10 to simultaneously work on the same wing panel workpiece 12. Each retractable support 16 incorporates an hydraulic cylinder (not shown) located in pits (not shown) below the support foundation 14. The retractable supports 16 provide the proper support height for the formers and the supported wing panel 12, and the individual hydraulic cylinders enable the respective retractable supports 16 to be lowered, i.e., moved away from workpiece 12 toward support foundation 14, to provide clearance for travel of riveting machine 10 along the workpiece 12.

As shown in FIGS. 1, 2, 4 and 5, riveting machine 10 is carried by a base 26 through an intermediate sub-base 28. Base 26 is mounted for horizontal longitudinal movement along the X-axis tracks 18 and 20 by means of base wheels 30 secured to base 26 while sub-base 28 is mounted for horizontal transverse movement on base 26 along a Y-axis provided by a pair of spaced parallel rails 32 on base 26 and sub-base wheels 34 secured to the underside of sub-base 28.

Figure 4:
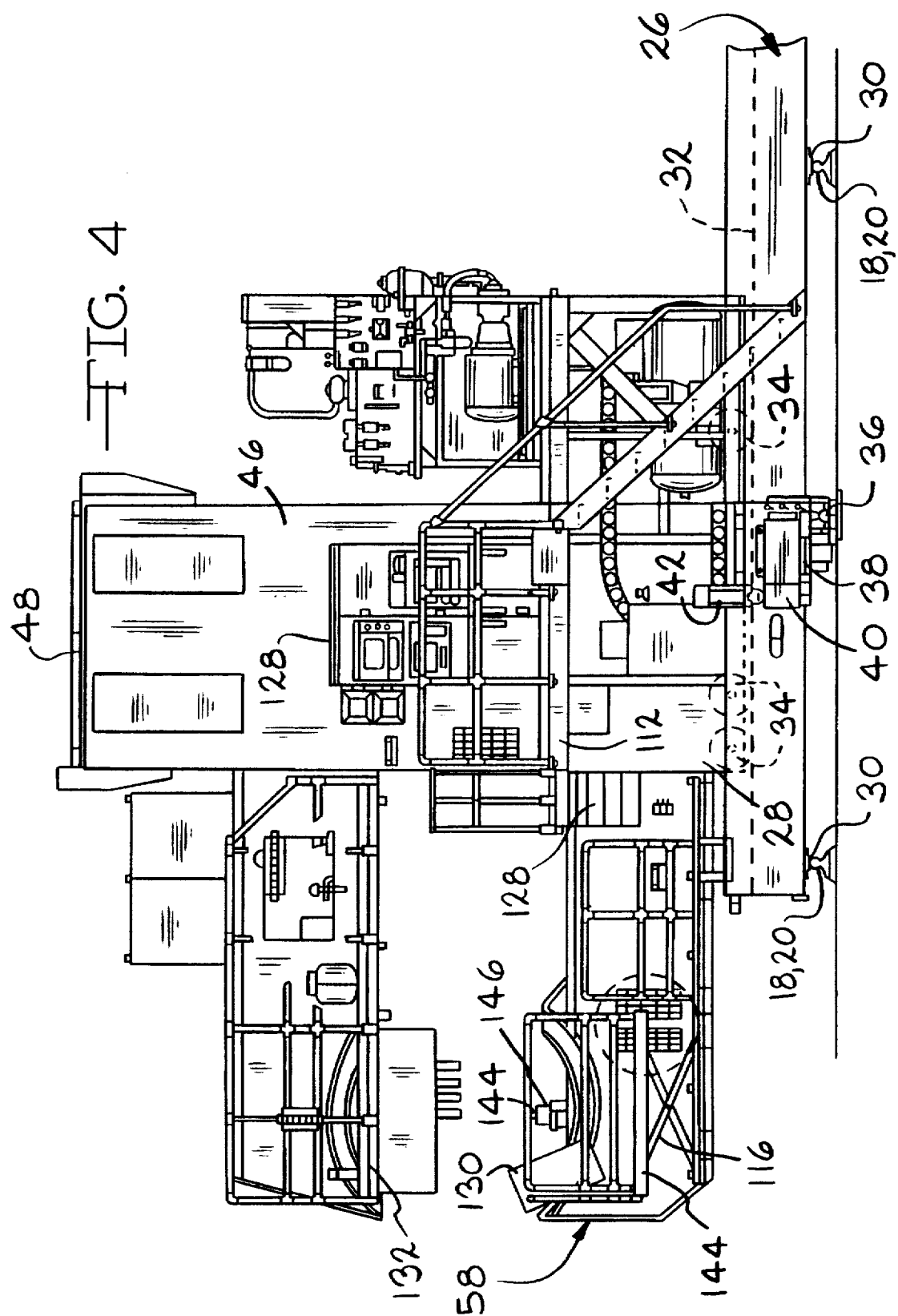
FIG. 4 is a detailed side elevational view of one of the machines of FIG. 1.
Figure 9A:
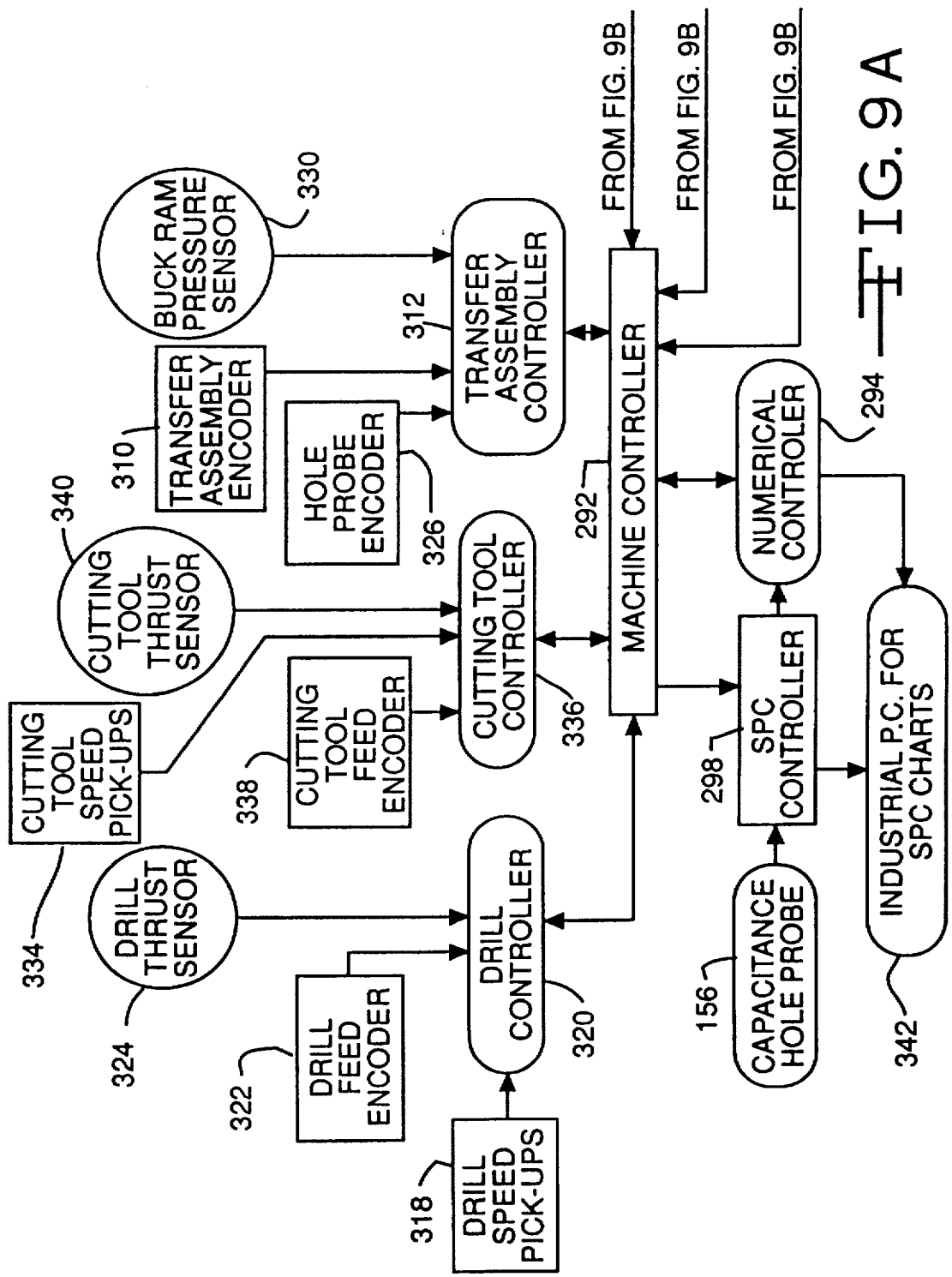
FIG. 9 is a system block diagram illustrating the control, monitoring and data recording system according to the present invention for use in the machines of FIG. 1.
Figure 9B:
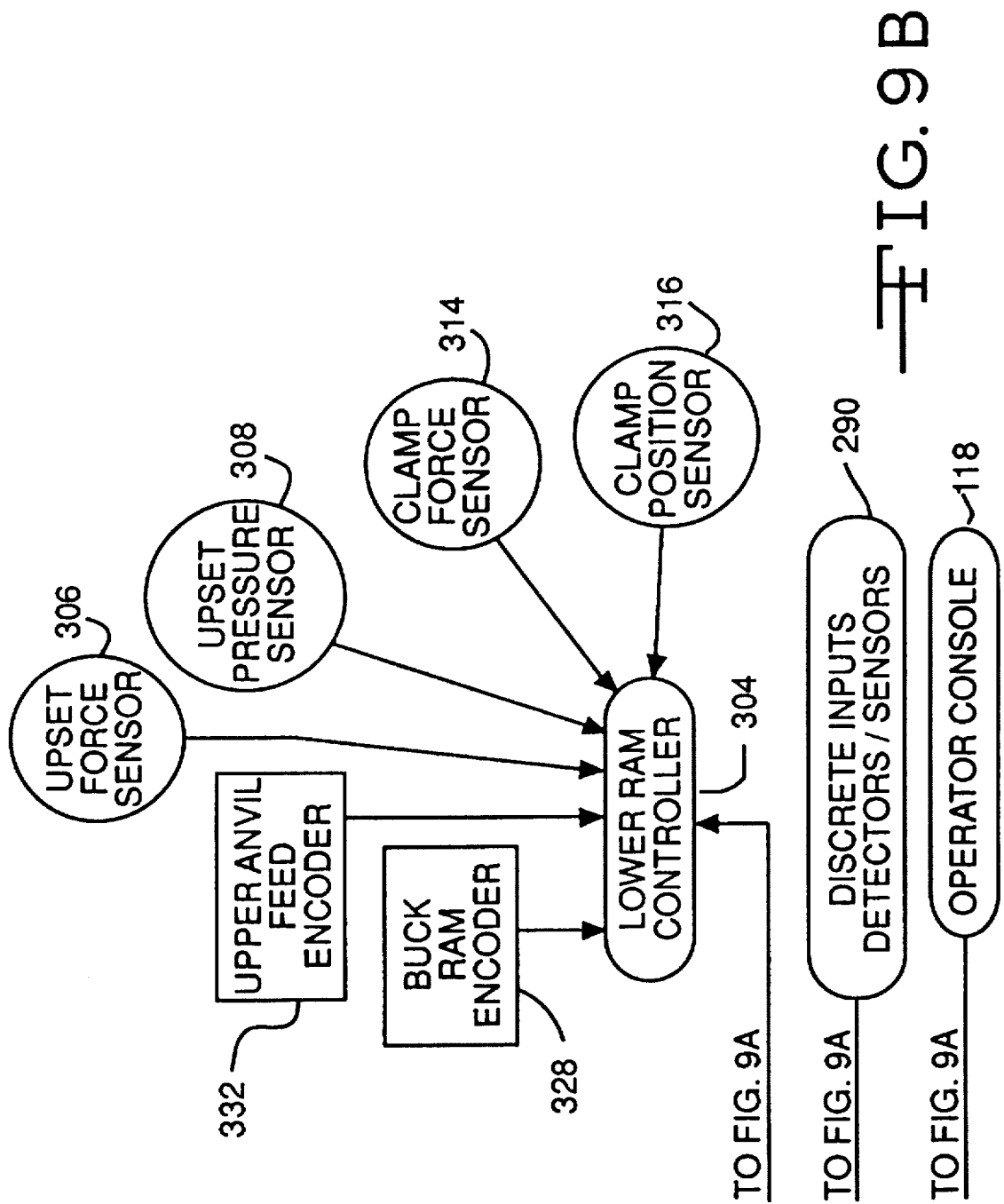

Reference will now be made to the drive means for producing longitudinal (X-axis) and transverse (Y-axis) horizontal movements of the base 26 and the sub-base 28, respectively. A third rail 36, as shown in FIGS. 1 and 4, extends intermediate and parallel to the rails 18,20 and serves as a drive rail and power bus for riveting machine 10. Riveting machine 10 is driven along tracks 18, 20 by means of a pinion gear 38 on the output of a gear box 40 carried by frame 26 and powered by a servo-motor 42. Pinion gear 38 meshes with a rack (not shown) on drive rail 36. The exact location of machine 10 along the X-axis is known at all times and derived from encoder feedback in a manner known to those skilled in the art. As shown in FIG. 9, which is a block diagram illustrating the flow of data information and control signals for the automatic drilling and riveting machine 10, such encoder feedback is part of the discrete inputs from detectors/sensors 290 that are sent to a machine controller 292 having a numerical controller 294 operatively associated therewith for control of the automatic drilling and riveting machine 10. The system of FIG. 9 will be described in detail presently. A third rail 37 extends intermediate and parallel to rails 32 and serves as a drive rail and power bus for movement of sub-base 28 in a traverse direction, in a manner known to those skilled in the art. For a more detailed description of a rack and pinion drive for moving an automatic riveting machine along a track reference may be made to U.S. Pat. No 3,534 896 issued Aug. 29, 1968 to Speller et al., entitled Riveting Machine and which is assigned to the assignee of the present invention, the disclosure of which is hereby incorporated by reference.

As shown in FIGS. 1, 2, 4 and 5, sub-base 28 includes a pair of spaced parallel upright side frame members 46 and an upper connecting tie member 48. A vertically movable frame or carriage, generally designated 50, has a pair of upright side frame members 52 connected by an upper carriage tie member 53 with side members 52 supported between sub-base side frame members 46. The side frame members 52 are guided for vertical movement along a Z-axis therebetween by means of a pair of vertical screw members (not shown) fixed to the lower opposite sides of the side frame members 52 of vertically movable carriage 50.

Figure 3:
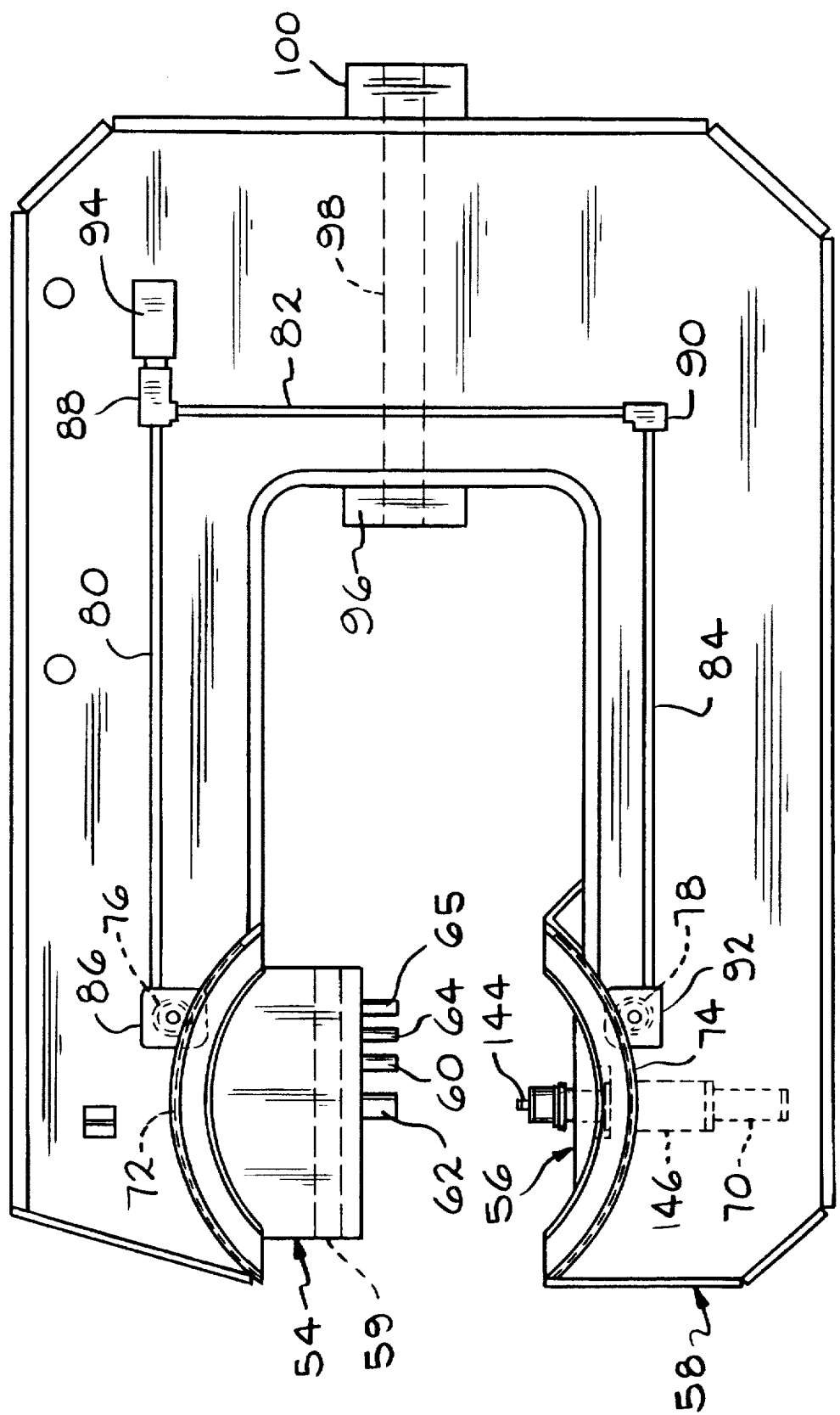
FIG. 3 is a side elevational view of a C-frame component of the machine of FIGS. 1 and 2.

As shown in FIGS. 1 and 3, opposed upper and lower blocks 54 and 56 are carried by the opposed upper and lower arms of a C-frame 58, shown disassembled in FIG. 3. Upper block 54 has a slidably movable transfer plate assembly 59 supporting a plurality of tools, such as a drilling tool assembly 60, a fastener insertion and upset tool assembly 62, a hole inspection tool assembly 64, and a ream/shave tool assembly 65. A coldwork tool assembly and a straight down vision resynchronization camera also can be carried by the transfer plate assembly 59. Lower block 56 supports an upset cylinder 70. Blocks 54 and 56 may be positioned at any point within the established limits of operation by movement thereof horizontally in both longitudinal and transverse directions and by vertical movement of carriage 50 between the sub-base side frame members 46.

Figure 2:
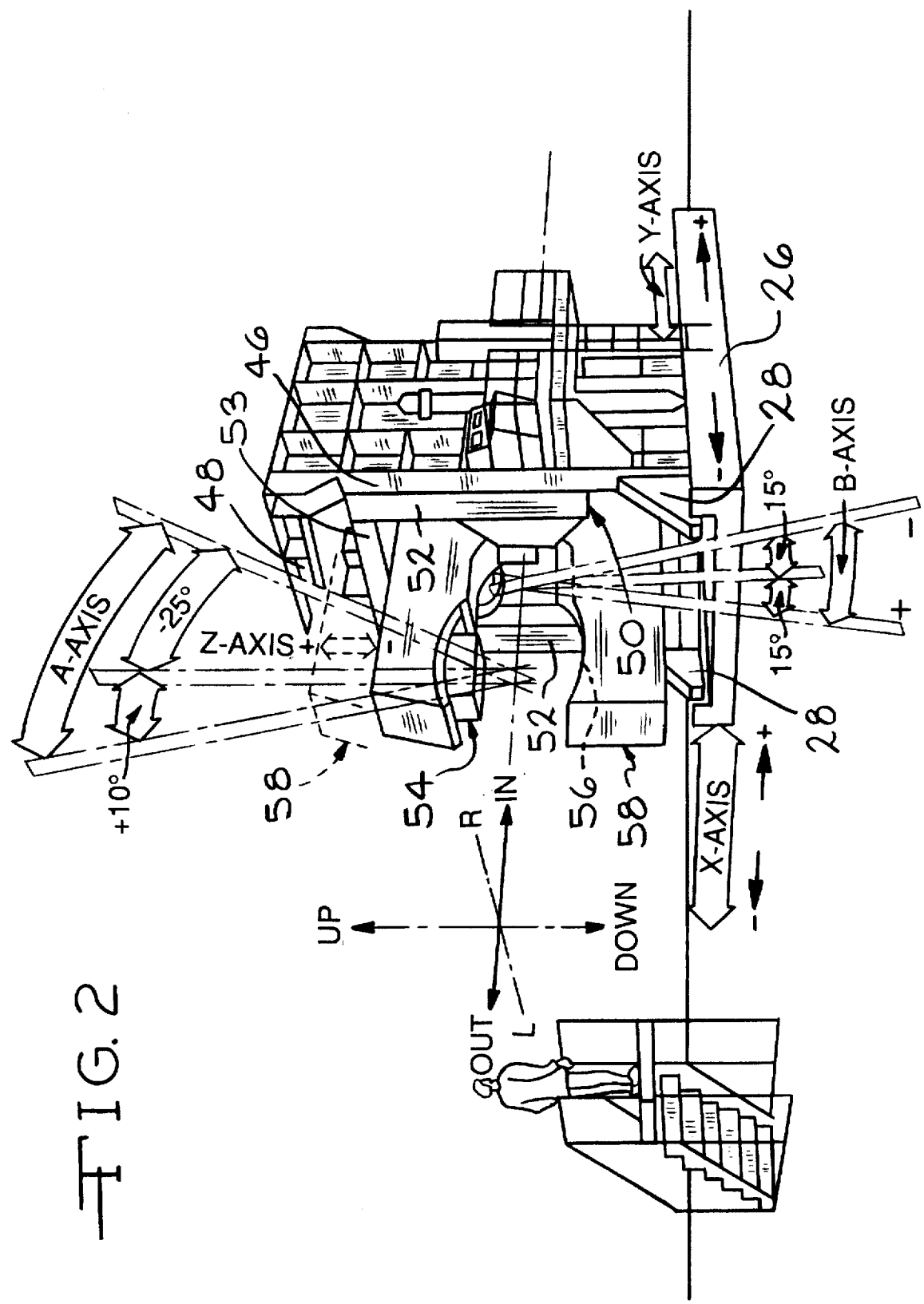
FIG. 2 is a diagrammatic view illustrating operation of one of the machines of FIG. 1.

In addition to the foregoing positioning movements, blocks 54 and 56 are jointly rotatable about two horizontal axes, one designated as the A-axis in FIG. 2 and extending parallel to the direction of movement of base 26 on tracks 18,20, that is, longitudinally of the riveting machine 10, while the other horizontal axis is designated as the B-axis in FIG. 2 and extends parallel to the direction of movement of sub-base 28 on main base 26, in other words, transversely of the riveting machine 10. For a more detailed discussion of the longitudinal and transverse movement of riveting machine 10, reference is made to the aforementioned U.S. Pat. No. 3,534,896.

Movement of blocks 54 and 56 about the A-axis parallel to the rails 18,20 is effected by synchronously rotating the blocks 54 and 56 relative to C-frame 58 by means illustrated in FIG. 3 and within established travel limitations determined by appropriate sensors (not shown), as for example preferably having a range of about +10 degree to about a −25 degrees from the vertical plumb line relative to the machine. Blocks 54 and 56 are guided for arcuate movement relative to the C-frame 58 by means of an arcuate sliding connection between each of the blocks 54 and 56 and the arcuate complementary surfaces of the C-frame 58. Such sliding connections are conventional and may comprise an arcuate dovetail connection or an arcuate T-slot connection, herein the T-slots in C-frame 58 are arcuate and the interfitting flanges of blocks 54 and 56 are likewise arcuate, as is well known to those skilled in the art. In that respect, blocks 54 and 56 have fixed thereto sector gear members 72 and 74, respectively. Pinions gears 76 and 78 mesh with sector gears 72 and 74 and are synchronously driven by shafts 80, 82, and 84 which are connected by right-angle drive assemblies 86 through 92. A reversible rotary electric motor 94 connects with shaft 80 to rotate the blocks 54 and 56 in either direction about the A-axis.

Figure 6:
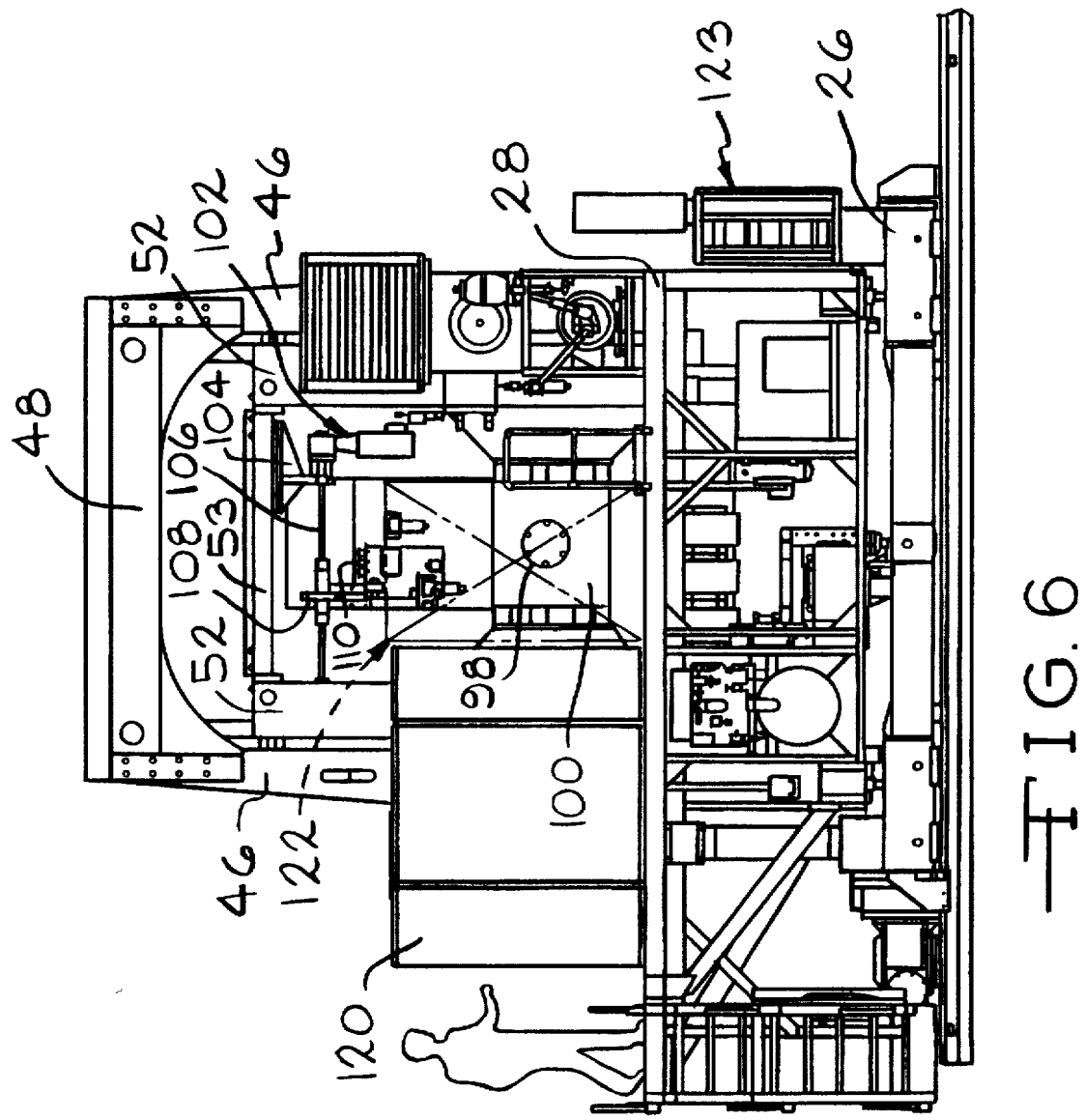
FIG. 6 is an end elevational view thereof.
Figure 7:
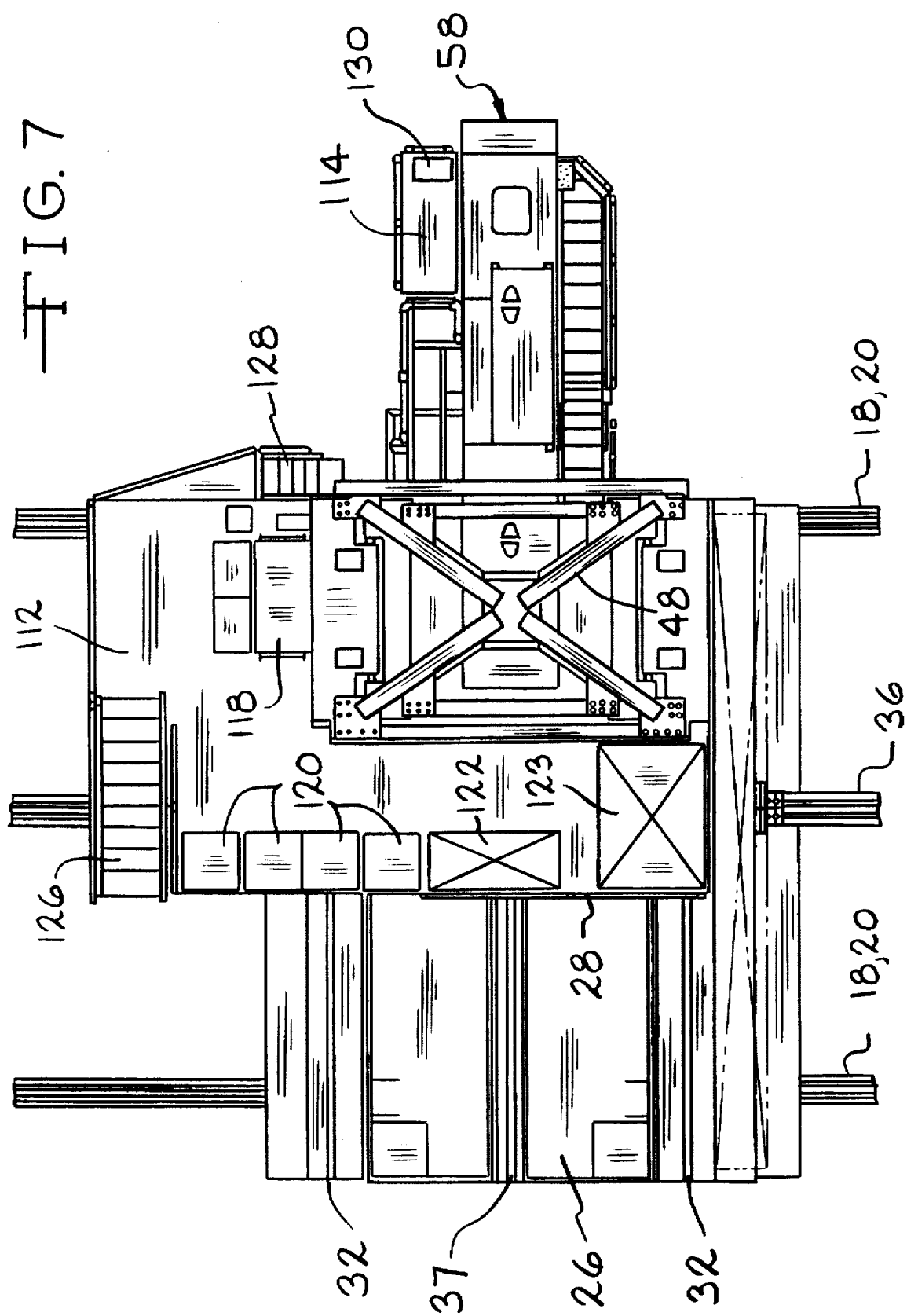
FIG. 7 is a top plan view thereof

Reference will now be made to the means for rotating C-frame 58 about the transverse longitudinal B-axis as shown is FIG. 2. This movement is within established travel limitations determined by appropriate sensors (not shown), as for example preferably having a range of between about ±15 degrees from a vertical plumb line relative to the machine. As shown in FIGS. 1 and 3, a bearing 96 is fixed to the front of vertically movable carriage 50. A shaft 98 which is fixed to C-frame 58 is journaled in bearing 96 and in a corresponding bearing 100 at the rear of the riveting machine 10. Motive power for the adjustment of C-frame 58 on its transverse longitudinal B-axis is by means of a motor and gearbox unit 102 shown in FIG. 6 mounted on upper carriage tie member 53 by a bracket 104 attached to the member 53 as shown in FIG. 6. Motor unit 102 drives a shaft 106 supported at one end by bracket 104 and at its distal end by a bearing (not shown) mounted on upright side frame member 52. Shaft 106 supports a worm wheel 108 that meshes with a worm gear 110 in C-frame 58. Thus, movement of shaft 106 in opposite directions produces pivotal B-axis movement of C-frame 58 through its shaft 98 and bearings 96 and 100.

Figure 5:
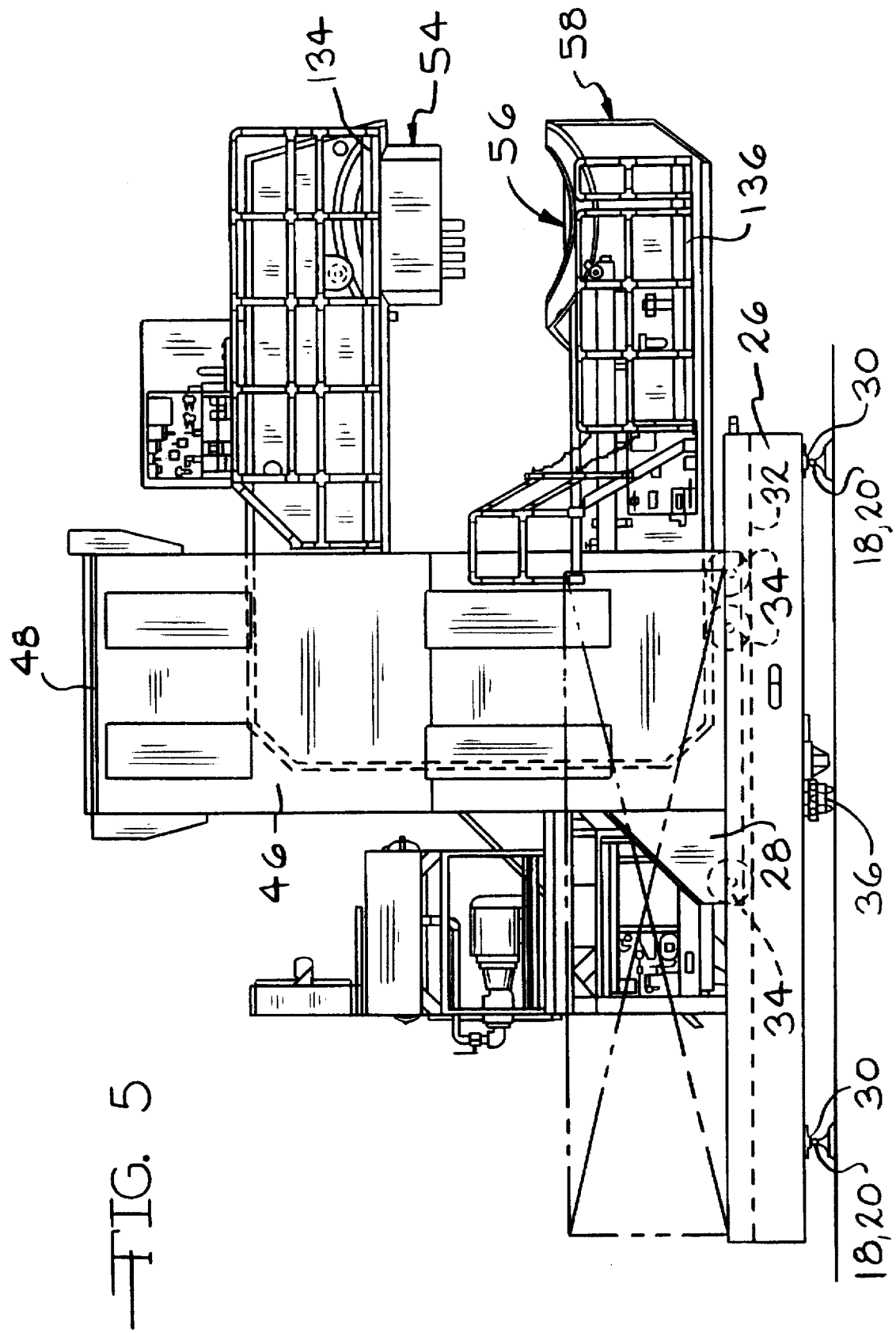
FIG. 5 is an opposite side elevational view thereof.

As shown in FIGS. 1 and 4–6, riveting machine 10 also is provided with a main operator platform 112 and a lower operator platform 114 that is raised and lowered vertically, i.e., along an axis parallel to the Z-axis, by suitable means such as a hydraulic scissors lift 116. Lower platform 114 provides for carrying components of the riveting machine 10. For example, in the riveting machine shown, main platform 112 extends from the C-frame 58 along a side opposite the direction of travel of machine 10 along the X-axis and around the back, opposite the blocks 54 and 56 and carries an upper operator console 118 which provide for operator input to the machine controller 292. Main platform 112 further provides for mounting a plurality of interface cabinets 120, automatic bin rivet feeders 122 and automatic bowl rivet feeders 123. Access to the main platform 112 is gained by means of stairs 126 adjacent cabinets 120 and stairs 128 adjacent upper operator console 118. Lower platform 114 is located on the same side of the lower arm of C-frame 58 as the upper operator console 118 and carries a lower operator console 130. The lower platform 114 and associated scissors lift 116 help position the operator stationed on the lower platform 114 at a desired height for visually watching the X-axis tracks 18,20. As shown in FIGS. 4 and 5, upper cat walks 132 and 134 are mounted on the opposed sides of the upper arm of C-frame 58 and a lower cat walk 136 is mounted on the lower arm of C-frame 58, on the same side as cat walk 134 and opposite lower platform 114, the cat walks providing access to various components on C-frame 58.

Reference will now be made to blocks 54 and 56 which carry the riveting tools and related instrumentalities. As shown in FIG. 3, a lower ram 144 is mounted on a fixed axis with respect to lower block 56 and is adapted to move vertically towards and away from the workpiece by a lower hydraulic cylinder 146 actuated by the upset cylinder 70 supported on the lower block 56. This vertical motion line constitutes the Z-axis which is referred to as the work centerline of the riveting machine 10. The transfer plate assembly 59 is adapted to be moved in the head 54 in a direction parallel to the B-axis of the C-frame 58, that is, parallel to the axis of pivot shaft 98, by means of a hydraulic operating transfer cylinder (not shown). A transfer assembly encoder designated 310 in FIG. 9 connected to a transfer assembly controller 312 and associated with the transfer cylinder provides positioning information to the machine controller 292 to effect precise and accurate registry of the respective tools into and out of the work centerline as the transfer plate assembly 59 moves linearly along head 54, thereby selectively positioning the various tool assemblies along the Z-axis work centerline for performing the various operations.

Although not shown in the drawings, a pressure foot bushing carried by a pair of spaced apart pneumatic cylinders contacts the upper surface of workpiece 12 and co- operates with lower ram 144 to clamp workpiece 12 for operation thereon by the various tools carried by the transfer plate assembly 59. A clamping force sensor designated 314 in FIG. 9 and clamp position transducer 316 associated with the pressure foot bushing send appropriate signals to a lower ram controller 304 and then to the machine controller 292 to monitor the exact position of the workpiece 12 with respect to the riveting machine 10.

Once a position of registry along the work centerline is established for the respective tools, the tools are then moved along the work centerline by suitable means, such as by a reciprocating hydraulic cylinder (not shown). Upon proper controlled reciprocating movement commanded by machine controller 292, the pressure foot bushing is adapted to contact the workpiece 12 around the location to be drilled and riveted, and in that respect the drilling tool assembly 60, hole inspection tool assembly 64 and the ream/shave tool assembly 65 move through a central opening in the bushing to contact workpiece 12 and perform the various operations thereon, as is well known to those skilled in the art. For the ream/shave and buck positions, the hydraulically controlled transfer plate assembly 59 holds the upper block 54 firmly in position while a transfer assembly encoder 310 provide positional data related to the spatial location of the upper block 54 to the machine controller 292 via transfer assembly controller 312. Proximity switches (not shown) are also used to determine the position of the drill and other tool assemblies and are located at opposite ends of the linear extent of the transfer plate assembly. For a more detailed description of a pressure foot bushing and its operation in an automatic drilling and riveting machine, reference may be made to U.S. Pat. No. 3,557,442, issued Jan. 26, 1971, entitled "Slug Riveting Method and Apparatus", and assigned to the assignee of the present invention, the disclosure of which is hereby incorporated by reference.

Riveting machine 10 of the present invention operates in the following manner. The machine 10 travels along workpiece 12 along rails 18 and 20 in the X-axis direction as shown in FIG. 3 to move successively to various locations on workpiece 12 where a hole is drilled and inspected and a rivet inserted in the hole and upset. During movement of machine 10 in this direction, the individual retractable supports 16 supporting the airplane wing formers comprising the workpiece 12 move downward, one-by-one, to surface 14 or below if a recess is provided, to allow the riveting machine 10 to move to the next location for inserting and upsetting in the workpiece 12. As the machine passes, the particular support 16 rises to support the workpiece 14 once again. In conjunction with movement of machine 10 along the X-axis, sub-frame 28 is movable along the Y-axis to reach additional locations to be drilled, inspected, and riveted. In addition, movement of C-frame 58 about the A-axis and the B-axis accommodate the surface contour of the workpiece 12. Tool assembly movement is controlled by the machine controller 292 via various motion controllers. At each riveting location, riveting machine 10 goes through the typical sequence of drilling the workpiece 12, inspecting the drilled hole, rivet insertion and upset, and rivet head shaving. The pressure foot bushing and the lower ram 166 contact opposite sides of the workpiece 12 and each of the tool assemblies carried by the transfer plate assembly 59 is selectively moved into alignment with the work centerline, and towards and away from the workpiece 12 to perform the various operation previously described on the workpiece 12. As the various tool assemblies perform their respective operations to thereby drill a hole in the workpiece 12, measure the hole profile, ream the hole, coldwork the hole and then insert and upset a fastener into the hole, and finally to shave the fastener flush with the surface of the workpiece 12, the various measurements or riveting machine functions are downloaded to the machine controller 292 in FIG. 9 and from there to the SPC control 298 according to the present invention. The SPC control 298 processes the measurements or riveting machine functions and then transmits them to an output device 342 which, for example, can be a printer, a CRT display, or a magnetic storage medium to provide a record. This record can be used to form a data base of information about each rivet installed by riveting machine 10 in a particular workpiece 12. The record and/or data base then can be used anytime in the future when such information is needed.

Thus, the system of FIG. 9 functions to download the various functions from the automatic fastening operation, including information and measurements obtained during a cycle of operation of the automatic fastening machine, to the machine controller 292 and the SPC control or processor 298. Drill controller 320, cutting tool controller 336, transfer assembly controller 312 and lower ram controller 304 are motion controllers, and each of these controllers can poll any of the other controllers to receive information from them. By way of example, in an illustrative system, each of the controllers 320, 336, 312 and 304 can comprise an AB Creonics (Allen Bradley) motion controller. As shown in FIG. 9, controllers 320, 336, 312 and 304 and operator console 118 are joined together in a remote I/O link for communication with machine controller 292. As previously described, before commencement of the automatic fastening operation, various control parameters are programmed into numerical controller 294 for use by machine controller 292 in operating the transfer means and various tools. By way of example, in an illustrative system, machine controller 292 can be an Allen Bradley PLC 5/40 controller, numerical controller 294 can comprise an Allen Bradley 9/260 controller, and SPC control 298 can be an Allen Bradley T60 terminal.

Figure 8:
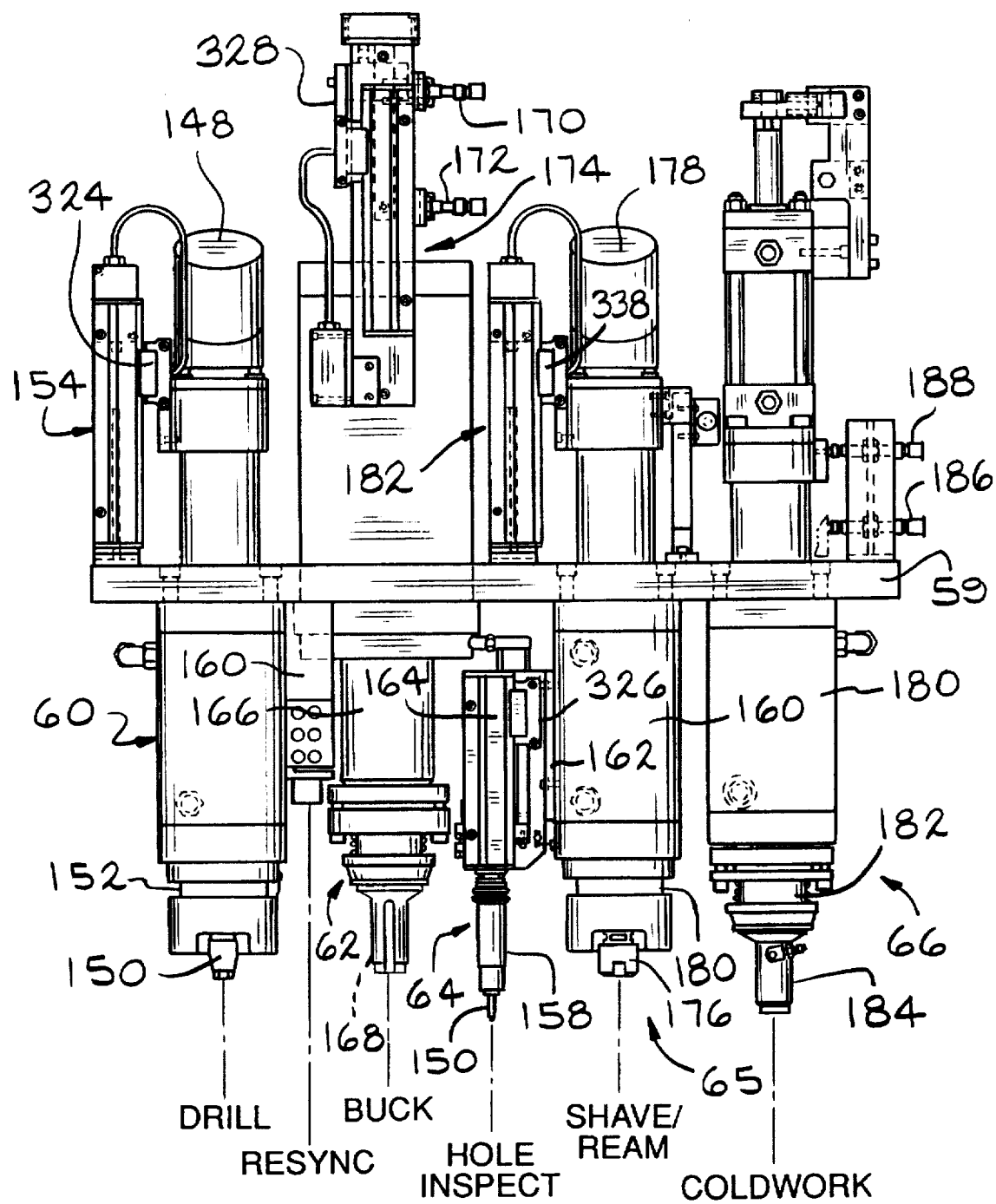
FIG. 8 is a fragmentary side elevational view illustrating a typical tool arrangement and transfer plate in one of the machines of FIG. 1.

The foregoing now will be described in further detail with particular reference to the manner in which the various measurements are obtained. FIG. 8 shows in further detail an illustrative tool arrangement in machine 10. In a typical drilling operation, the initial position of transfer plate assembly 59 is such that the drilling tool assembly 60 is in axial alignment with lower ram 144 provided by lower block 56, which, as stated above, is the Z-axis or work centerline for the various operations of machine 10. The drilling tool assembly 60 is used to drill a fastener receiving opening or hole through the workpiece 12 and comprises a rotary hydraulic motor 148 that provides rotary action to a drill tool 150 and a linear hydraulic cylinder 152 for moving the motor-drill combination toward and away from the workpiece. Two magnetic pickups, illustrated as block 318 in FIG. 9, are mounted 90° apart on the hydraulic motor 148 to detect pulses created by a tachometer gear (not shown) mounted on the motor 148 and send drill speed feedback signals to a drill controller 320 that relays this information to the numerical controller 300. The hydraulic cylinder 152 provides feeding and retraction of drill tool 150. A limit switch signals the machine controller 292 when the drill tool 150 is fully retracted while an encoder read head 154 mounted on the drill tool assembly 60 and connected to a drill feed encoder 322 measures drill tool 150 linear position, including drill full down.

Drill feed can place at two different rates during each cycle. A fast approach rate is used to transfer the drill tool 150 down to a position proximate the workpiece 12 at a relatively rapid rate. The drill tool 150 then approaches and penetrates the workpiece 12 at a preset feed rate which is optimum for the drill diameter, drill speed, and workpiece material. The drill feed encoder 322 tracks drill location and changes the linear movement from the approach rate to the feed rate at a preset point above the workpiece 12 while a thrust sensor 324 sends penetration force measurements to the drill controller 320 shown in FIG. 9. As the drill tool 150 moves along the work centerline to its descent limit with respect to workpiece 12, the drill controller 320 sends appropriate data to the machine controller 292. This data is used to calibrate the drill feed encoder 322 during each drill operation, and initiate when the drill cycle is completed.

A straight down vision resynchronization camera, designated 160 in FIG. 8, is preferably mounted on transfer plate assembly 59 between the drill tool assembly 60 and the rivet insertion and upset tool assembly 62, although camera 160 can be located elsewhere on assembly 59. Thus, camera 160 is mounted on a structure that provides a sturdy foundation to maintain proper alignment for movement into and out of registry with the work centerline. Camera 160 periodically fine tunes the position of the riveting machine 10 in relation to its spatial orientation along the various axes previously described in detail, by viewing a reference hole or kado dot positioned at intervals on the workpiece 12. At the commencement of each riveting cycle, riveting machine 10 moves to a theoretical work centerline above the workpiece 12. When the reference holes or kado dots are encountered, the vision camera 160 outputs to the machine controller 292 the axes movement necessary to correctly position the riveting machine 10 to the actual center of the reference hole or kado dot.

Next to the resynchronization camera 160 on the transfer plate assembly 59 is the fastener insertion and upset tool assembly 62 which is used to insert a fastener (not shown) into the drilled hole and to provide the upset force in co-operation with the lower ram 44. Thus, after the hole is drilled, the machine controller 292 initiates the transfer controller 312 to signal the transfer plate assembly 59 to remove the camera 160 from alignment with the work centerline and to move the hole inspection tool assembly 64 into axial alignment with the work centerline.

The hole inspection tool assembly 64 is positioned between the ream/shave tool assembly 65 and the rivet insertion and upset tool assembly 62, and following the drilling operation is used to measure the hole profile to determine whether the hole is within an acceptable range of parameters. Inspection tool assembly 64 comprises a probe 156 depending from a probe body 158 attached to a bracket structure (not shown) that is linearly movable along the work centerline to a position centered in the drilled hole by means of a probe cylinder (not shown) which in turn is fixedly secured to the upper ram assembly 160 of the ream/shave tool assembly 65 by a cylinder and slide bracket 162 (only partially shown in FIG. 8). Movement of the probe body 158 along the work centerline is measured by an encoder read head 164 electronically connected to a hole probe encoder designated 326 in FIG. 9 connected to the transfer assembly controller 312. This provides for precise positioning of the probe 156 at a centered position inside the hole. Capacitive plates (not shown) are mounted in rings extending linearly along the length of the probe 156 and provide capacitance measurements that are sent to the machine controller 292 which processes these measurements to provide an indication of the hole dimensions and determine, among other measurements, roundness, position, and hole profile. If the processed measurements are within an acceptable range of parameters, the machine controller 292 sends an appropriate signal to the inspection tool assembly 64 and the probe 156 is removed from the hole and the fastener insertion and upset tool assembly 62 is then centered over the hole to inset fastener. For a more detailed discussion of the hole inspection assembly, reference may be made to U.S. patent application Ser. No. 07/971,890, filed Nov. 4, 1992, and entitled "Hole Probe Apparatus and Method", which is assigned to the assignee of the present invention, the disclosure of which is hereby incorporated by reference.

Thus, before the fastener is inserted into the hole and upset to join the workpieces 12, the hole inspection tool assembly 64 is used to provide the SPC controller 298 associated with the machine controller 292 with measurements related to the hole profile including its size and degree of roundness. As shown in FIG. 8, the fastener insertion and upset tool assembly 62 consists of a hydraulic bucking ram 166 with an upper anvil upset tool 168 attached to the bottom thereof. Rivet fingers (not shown) provide for catching and supporting a rivet released from a conduit leading from either the bowl rivet feeders 123 or the bin rivet feeders 122 and then for aligning the rivet along the work centerline for inserting the rivet into the hole in a known manner. Bucking ram 166 fully up and fully down limit switches 170 and 172, respectively, send appropriate signals to an encoder read head 174 mounted on the fastener insertion and upset tool assembly 62 and connected to a bucking ram encoder to inform the machine controller 292 via the transfer assembly controller 312, of the fully extended and fully retracted positions of ram 166.

During a rivet insertion operation, bucking ram 166 moves down to move upper anvil 168 downward to engage the rivet held in the rivet fingers and to insert the rivet into the drilled hole in workpiece 12 and thereby buck the upper head of the rivet in preparation upsetting pressure from the lower ram 144. The lower ram controller 304 then signals lower ram 144 to move towards the workpiece and serve as a back stop for the other side of the rivet. The lower ram controller 304 receives inputs from the upset force sensor 306 and upset pressure sensor 308 mounted on the upset cylinder 146 to apply an upset pressure measured by upset pressure sensor 308. Similarly, the upset force sensor 306 senses the force exerted by cylinder 146 as the lower ram 144 controlled by upset cylinder 70 via the lower ram controller 304 moves toward the bucking ram 168 to apply upset pressure to the rivet to join the wing panel to the former. The upper anvil 168 applied pressure is monitored by bucking pressure ram sensor 330 which communicates with the machine controller 292 via the transfer assembly controller 312. An upper anvil feed encoder 332 measures the linear position of bucking ram 166 along the work centerline, including bucking ram 166 down during rivet upset.

The bucking ram 166 also can perform vibratory insertion of interference-fit fasteners. During a fastener vibration cycle, air is fed to a pneumatic hammer assembly (not shown) inside the bucking ram 166. In response to appropriate command signals from the machine controller 292, the hammer assembly moves back and forth rapidly, vibrating the bucking ram 166 and thereby inserting the fastener. For a more detailed description of a vibrating fastener inserting apparatus, reference may be made to U.S. Pat. No. 4,998,943, issued Mar. 12, 1991, entitled "Method of Inserting Fasteners" and assigned to the assignee of the present invention, the disclosure of which is hereby incorporated by reference.

Next to the hole inspection tool assembly 64 on the transfer assembly plate 59 is the ream/shave tool assembly 65, which is very similar in construction to the drilling tool assembly 60, and is selectively used to mill the upper head of an upset rivet flush with the workpiece 12 upper surface using a cutting tool comprising a shave tool, or to mill the inside surface of the drilled hole. In a manner similar to that of the drilling tool assembly 60, this tool comprises a rotary hydraulic motor 178 that provides rotary action to the cutting tool 176 and a linear hydraulic cylinder 180. Two magnetic pickups represented as block 334 in FIG. 9, are mounted 90° apart on the hydraulic motor 178 to detect pulses created by a tachometer gear (not shown) mounted on the motor 178 and send rotary speed feedback signals to a cutting tool controller 336 that relays this information to the machine controller 292. The hydraulic cylinder 180 provides cutting tool 176 feeding and retraction. A limit switch signals the machine controller 292 when the cutting tool 176 is fully retracted, while an encoder read head 182 mounted on the ream/shave tool assembly 65 and connected to a cutting tool feed encoder 338 measures cutting tool linear position, including cutting tool full down.

In a manner similar to that of the drill tool assembly 60, cutting tool 176 feed takes place at two different rates during each cycle. The fast approach rate is used to transfer the cutting tool 176 down to a position proximate the workpiece 12 at a relatively rapid rate. The cutting tool 176 then approaches and penetrates the rivet surface or workpiece hole at a preset feed rate which is optimum for the cutting tool being used, ream/shave speed, and workpiece material. The cutting tool encoder 338 tracks cutting tool location and changes the linear movement from the approach rate to the feed rate at a preset point above the workpiece 12 while a thrust sensor 340 sends penetration force measurements to the cutting tool controller 336. As the cutting tool 176 moves along the work centerline to its descent limit with respect to workpiece 12, the cutting tool controller 336 sends appropriate data to the numerical controller 300. This data is used to calibrate the cutting feed encoder 338 during each ream/ shave operation, and initiate when the cycle is completed. The ream/shave tool assembly 65 is used for shaving when installing rivet-type fasteners and for reaming when installing two-piece fasteners, as is well known to those skilled in the art.

In those riveting applications where bolts and other similar two piece-type fasteners are used, coldworking the hole prior to fastener insertion is required to resist localized stress concentrations around the periphery of the hole. Tool assembly 66 performs this function and is positioned on the transfer plate assembly 59 next to the ream/shave tool assembly 65. The coldwork tool assembly 66 serves to prestress the hole before rivet insertion by expanding the drilled hole to a desired hole size, thereby increasing the material strength around the hole. The cold working tool assembly consists of two hydraulic rams, an external hydraulic mandrel cylinder 180 and a tandem internal coldwork cylinder 182 having a coldwork mandrel 184. The external cylinder 180 transfers the coldwork cylinder 182 down to the work surface. The coldwork cylinder 182 then inserts the mandrel 184 through the drilled hole and then draws the mandrel back through the hole. As the mandrel 184 retracts, the tool enlarges radially, expanding the hole. Limit switches 186 and 188 at the fully extended and fully retracted positions signal the machine controller 292 at both cylinder locations. A pressure transducer in the hydraulic line (not shown) feeding the mandrel cylinder 180 measures mandrel pull force through the workpiece 12. This force measurement is then sent to the SPC controller 298. For a more detailed discussion of an illustrative coldwork tool assembly, reference may be made to U.S. Pat. No. 4,869,091, issued Sep. 26, 1989, the disclosure of which is hereby incorporated by reference.

The present invention is illustrated further by the following examples.

EXAMPLE I

A typical hole inspection probe 156 may have eight capacitance plates positioned around the circumference of the probe 156, with six rows of these eight plate rings extending down the shaft of the probe. In FIG. 10, which is a display provided by device 342 in FIG. 9, a hole in a calibration block accurate to within 0.00045 mm (18×10 in) was measured with probe 156. Using the different level averages, the profile of the hole can be observed. Measurements on the block were repeatable to within 0.005 mm (0.0002 in). In using the workpiece 12 itself as the opposing capacitor plate, the probe 156 was found to be accurate with up to 10k ohms placed in ground path of the workpiece 12.

EXAMPLE II

Figure 11:
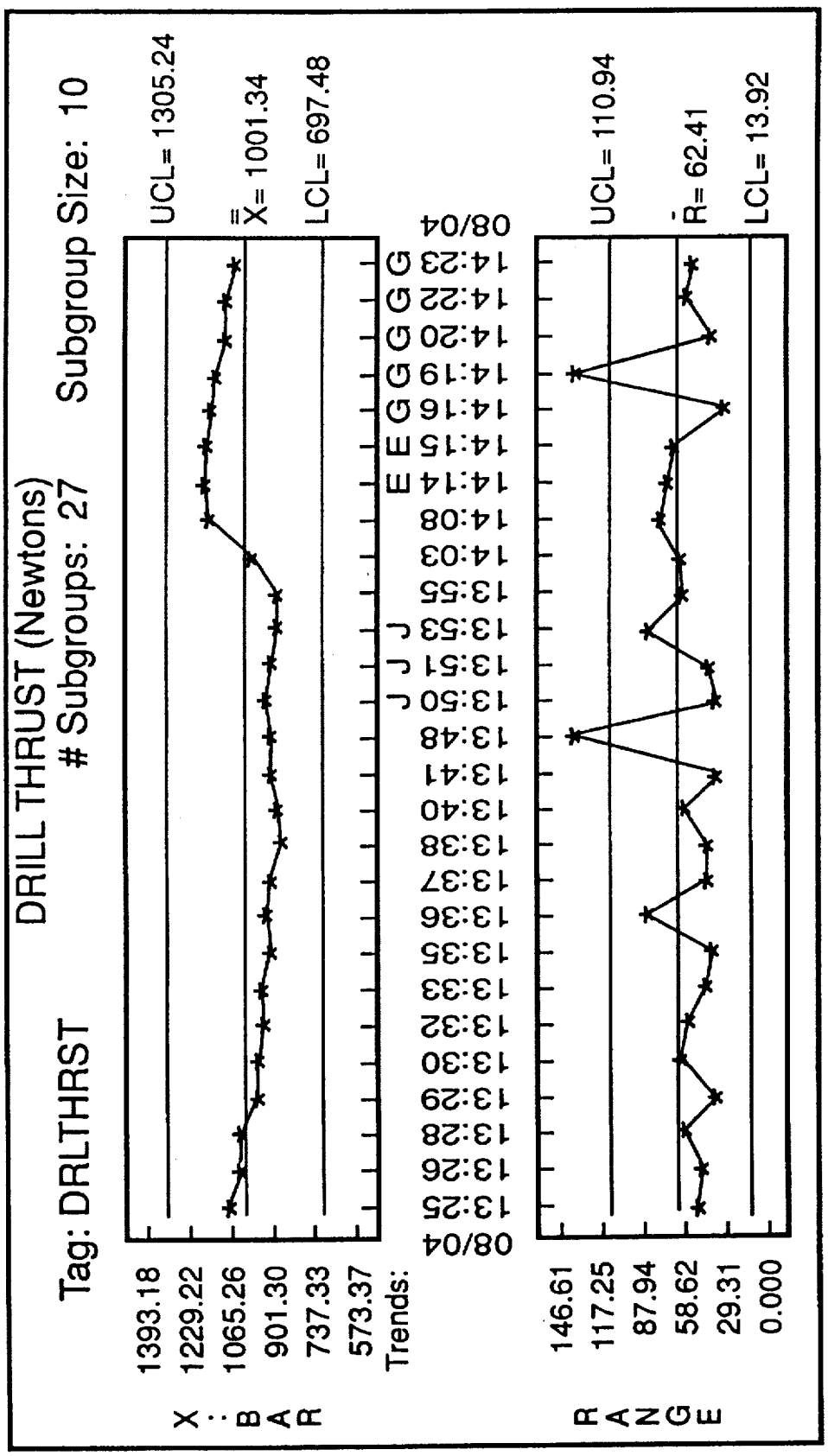

FIG. 11 shows one of the uses of the SPC thrust measurement of the drilling tool 150, wherein 270 holes were drilled into a piece of 12.7 mm (0.50 in) 7075 T6 aluminum. FIG. 11 is a display provided by device 342. With a small amount of lubrication a 7.54 mm diameter, non-countersunk drill bit was run at a speed of 6000 RPM and a feed rate of 914 mm per minute (36 IPM). Each point on the plot represents a subgroup of 10 drill thrust measurements. The drill thrust follows an expected pattern as the bit first breaks in by tending to grab at the workpiece.

After 40 holes the drill thrust stabilizes near 900N (202.3 lbs) and remains near there for the next 160 holes. At this point, the drill is removed from the spindle and slightly dulled with a stone. This dulling is immediately evident in the subsequent 10 holes which average over 1200N (269.7 lbs.) of force. Again, the drill tends to break in and the thrust drops approximately 100N (22.5 lbs.) over the next 70 holes. Over the 270 holes drilled, the Rbar chart shows that twice the values within a subgroup exceeded the upper control limit.

The trend letters below the Xbar chart indicates when the process mean starts to exhibit unusual characteristics. The J trend indicates the previous eight subgroups were below the population mean and the E trend warns that at least 2 of the last 3 subgroups were above the population mean. These trends can be used to trigger an alarm that the process may be heading to an upper or lower control limit. Similar Xbar and R charts can be configured to track the thrust of a cutting tool such as a shave tool or a ream tool.

EXAMPLE III

Figure 12:
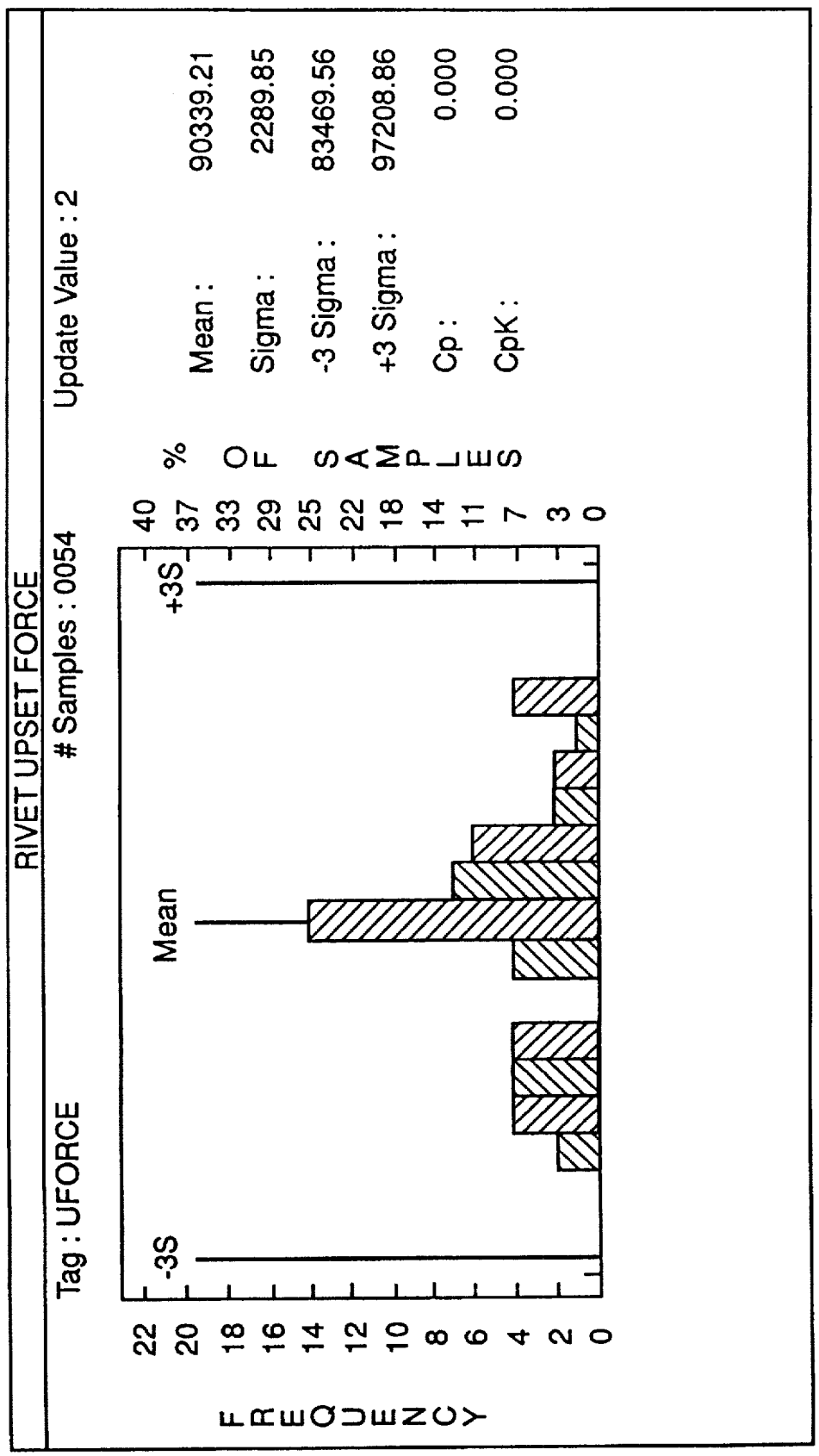

A critical area in the deformation of a rivet is the force with which that rivet is upset. With the use of a load cell, this force can be analyzed using a histogram chart, as shown in FIG. 12 which is a display provided by device 342. Using a −10 aluminum index head slug, a desired force of 88,964N (20,000 lbs) was preset into the machine controller 292. One hundred-eight rivets were then upset using the fasteners insertion and upset tool assembly 62 while monitoring the upset force in subgroups of two.

The histogram was used to determine if fastener upset process was stable by examining the shape of the distribution. In a stable process, the distribution is bell-shaped with the majority of samples centered around the mean (90339.2N). All of the values fell within the ±3 sigma limits. One sigma or standard deviation is equal to 2289.85N.

EXAMPLE IV

Figure 13:
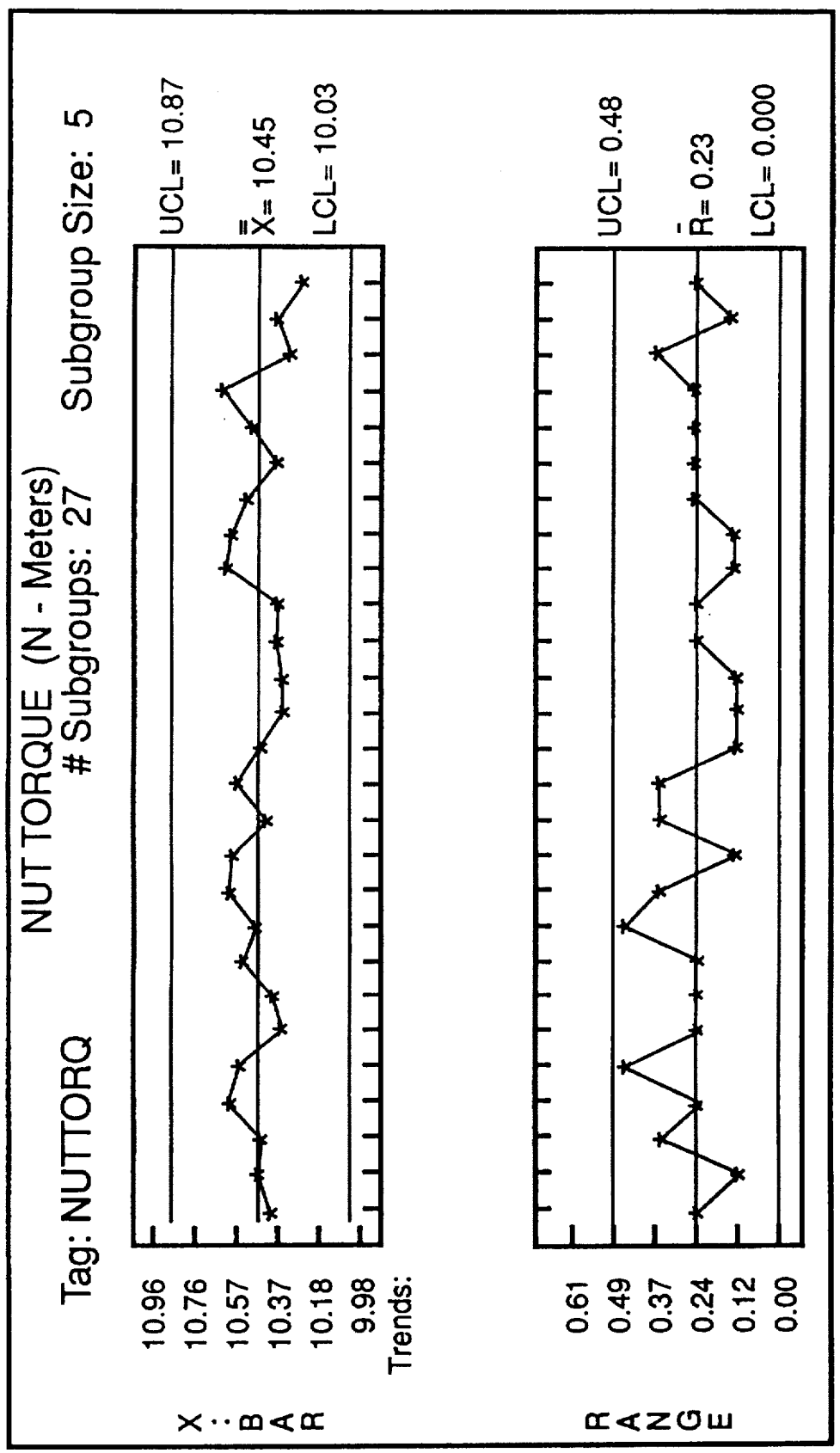

Another example of the use of SPC controller 298 is for measuring the torque force required for tightening a nut on the bolt portion of a two piece-type fastener using a nut-runner tool and the angle in degrees that the nut is tightened beyond a predetermined torque value, as previously described. Using a −8 threaded two-piece fastener, a desired torque of 10.16N-Meters (90 in-lbs) was preset on the tool. With a subgroup of 5 samples, 135 nuts were run. As indicated in FIG. 13, the Xbar of the entire population was 10.45N-Meters (92.54) in-lbs) and the R bar was 23N-Meters (2.03 in-lbs).

Figure 14:
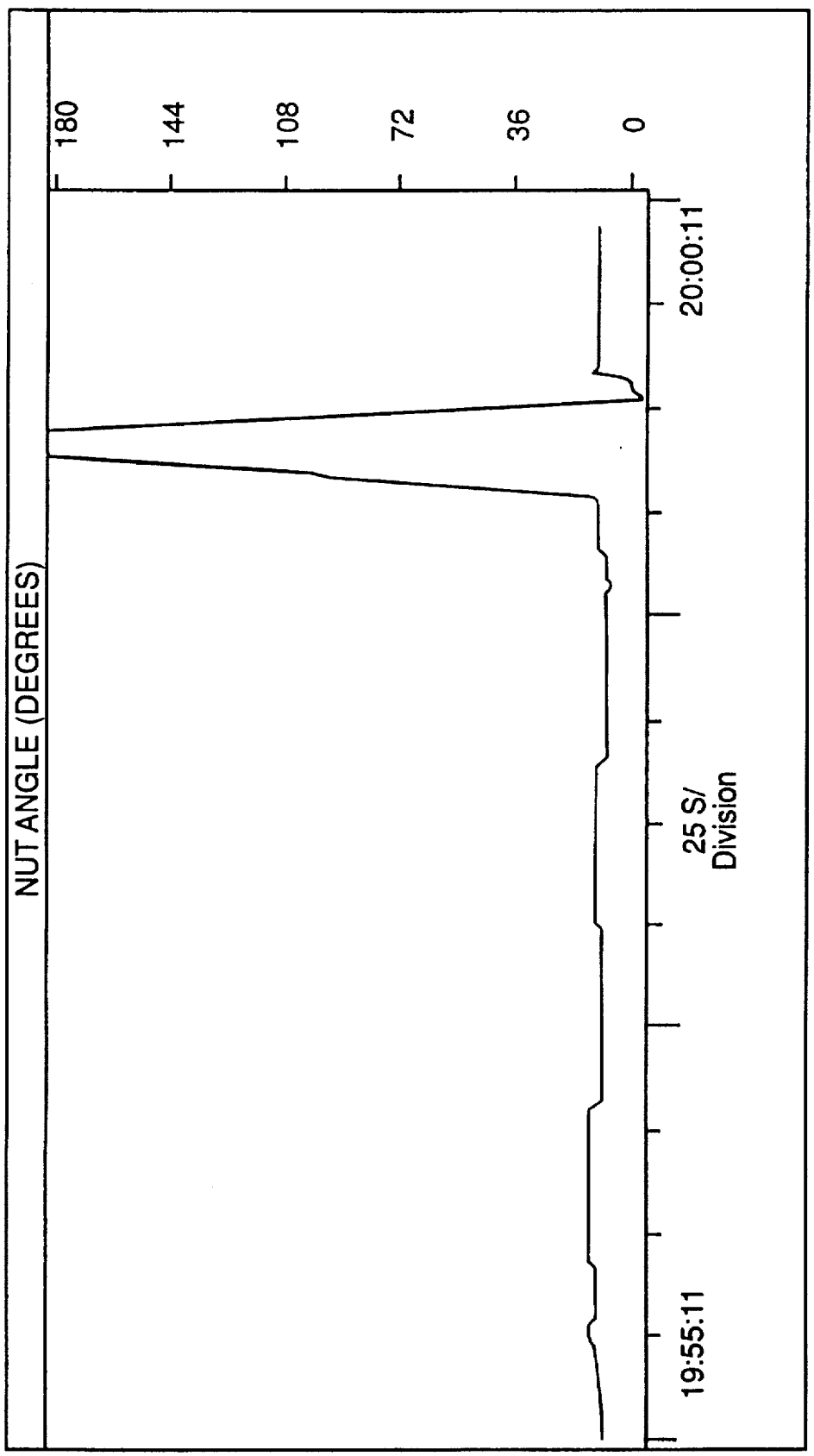

The angle of the nut is the degree to which the nut is tightened after a preset torque has been reached. This is useful in determining if a nut has been stripped or not tightened at all. FIG. 14 shows a real time graph of a typical nut run to approximately 11 degrees. A stripped nut would be obvious by an uncharacteristic peak in the angle reading.

EXAMPLE V

By tracking the time, date and number of particular faults, the maintenance of a riveting machine 10 can be greatly enhanced. Data such as that shown in FIG. 15 (i.e. when the last fault occurred and the total number of faults) can be used to troubleshoot areas of concern quickly, and more importantly can be used as a preventive measure to replace or fix an operation before it becomes a problem.

It is therefore apparent that the present invention accomplishes its objects. While an embodiment of the present invention has been described in detail, that is for the purpose of illustration, not limitation.

What is claimed is:

1. An automatic fastening machine including a plurality of automatically operated tools for performing operations during installation of a fastener in a workpiece, said machine comprising:

a) a plurality of automatically operated tools and a corresponding plurality of motion controllers, one for each of said tools, for controlling operations of said tools and for receiving measurements and data related to said tools as they perform the operations;

b) a machine controller connected in controlling relation to said motion controllers for providing programmed control of said automatic fastening machine through said motion controllers and for receiving from said motion controllers said measurements and data related to said tools; and c) a processor means operatively connected to said machine controller for receiving from said machine controller said measurements and data related to said tools and for processing said measurements and data for monitoring and analyzing both real-time and historical data related to the operations performed by said tools;

d) wherein the automatic fastening functions including downloading said measurements and data from said machine controller to said processor means to provide both real time data for substantially immediate use in controlling said machine and historical data for subsequent use in analyzing operation of said machine.

2. The automatic fastening machine of claim 1 wherein said processor means has an output and further including computer means having an input connected to said output of said processor means for utilizing output information provided by said processor means.

3. The automatic fastening machine of claim 2 wherein said means connected to said output of said processor means comprises means forming a record of fastener installation information for each fastener installed in the workpiece.

4. The automatic fastening machine of claim 1 wherein each of said motion controllers can poll any of the other motion controllers via said machine controller for obtaining information therefrom.

5. The automatic fastening machine of claim 1 wherein an input/output device is connected to said machine controller in a manner such that said motion controllers and said input/output device are joined together in a remote input/output link for communication with said machine controller.

* * * * *

UNITED STATES PATENT AND TRADEMARK OFFICE
CERTIFICATE OF CORRECTION

PATENT NO. : 5,615,474
DATED : April 1, 1997
INVENTOR(S) : Kellner et al

It is certified that error appears in the above-indentified patent and that said Letters Patent is hereby corrected as shown below:

Col. 14, line 65 - delete "including" and insert --include--.

Signed and Sealed this

Seventh Day of October, 1997

Attest:

BRUCE LEHMAN

Attesting Officer

Commissioner of Patents and Trademarks